Sept. 25, 1951             H. O. DAY             2,569,038
STIFFENER FOR HYDRAULIC CYLINDERS
Original Filed Aug. 3, 1946             3 Sheets-Sheet 1

FIG.I.

INVENTOR:
HERBERT O. DAY
BY
ATTORNEY

Sept. 25, 1951            H. O. DAY            2,569,038

STIFFENER FOR HYDRAULIC CYLINDERS

Original Filed Aug. 3, 1946            3 Sheets-Sheet 2

INVENTOR:
HERBERT O DAY
BY
Autumn Middleton
ATTORNEY

Sept. 25, 1951 H. O. DAY 2,569,038
STIFFENER FOR HYDRAULIC CYLINDERS
Original Filed Aug. 3, 1946 3 Sheets-Sheet 3
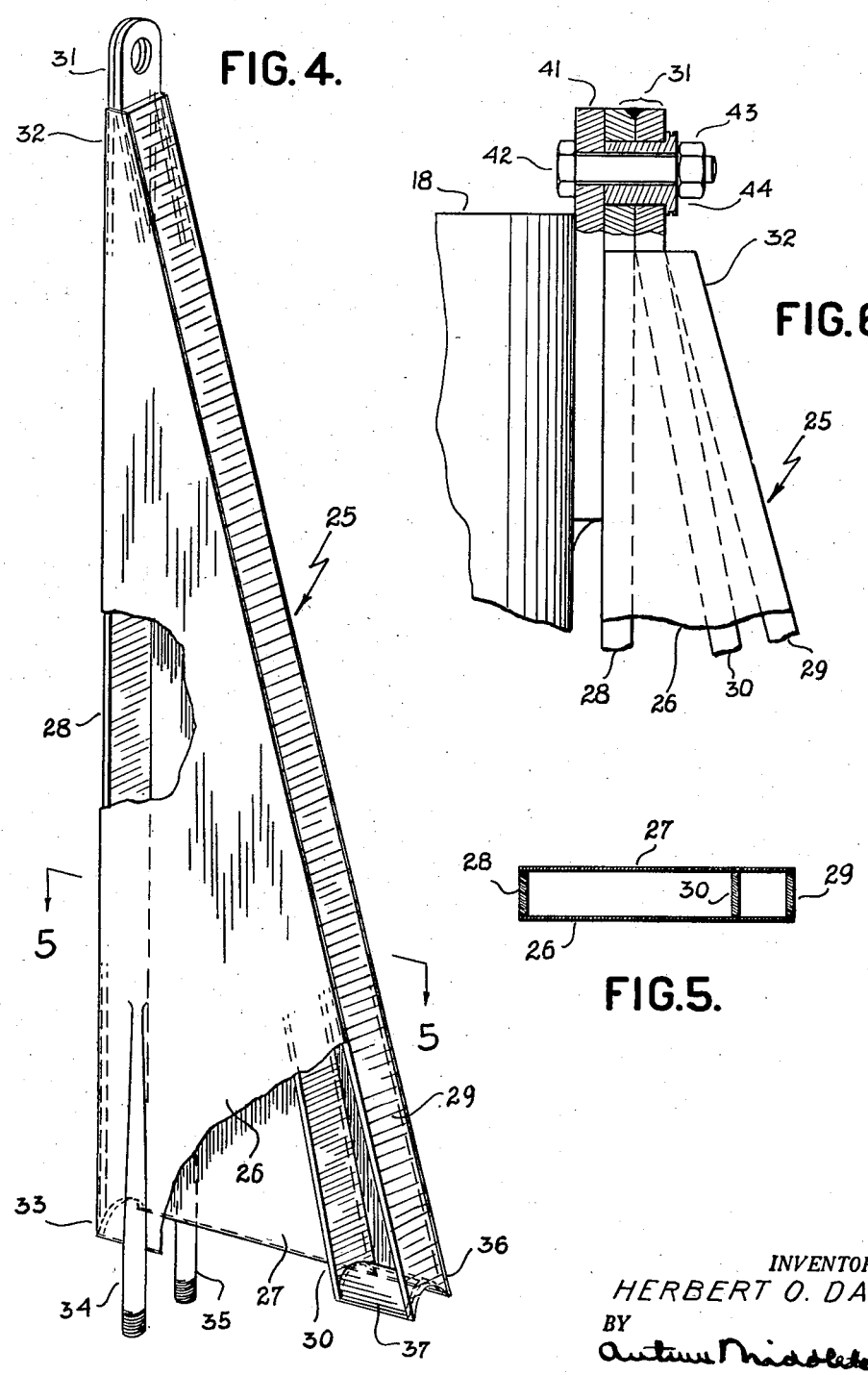
INVENTOR:
HERBERT O. DAY
BY
ATTORNEY Patented Sept. 25, 1951

2,569,038

UNITED STATES PATENT OFFICE 2,569,038

STIFFENER FOR HYDRAULIC CYLINDERS

Herbert O. Day, Bowling Green, Ohio

Original application August 3, 1946, Serial No. 688,386. Divided and this application September 15, 1948, Serial No. 49,421

1 Claim. (Cl. 189—34)

This invention relates to hydraulic power or hoist cylinders, hydraulic jacks, or telescoping jack devices, and more particularly to those that are swingably mounted and are thus capable of moving a swingable load. Further particularized, this relates to improvements in stiffener or bracing members for the kind of power cylinder that is mounted upon and extends transversely with respect to a shaft member, to be swingable about the axis of that shaft member, while a reciprocable piston rod in the cylinder is being extended or retracted.

For example, such a power cylinder and transverse shaft member may serve in actuating the tiltable body of dump trucks, in which case the shaft member extends across and is journalled upon the chassis frame of the truck. Hence the shaft member will herein also be termed the cross shaft member.

A problem exists in so mounting the cylinder upon the cross shaft member that undesirable power stress reactions from the cylinder upon the shaft member, especially undesirable bending stresses due to centrally concentrated transverse load upon the shaft member are minimized or avoided. So it is an object of this invention to solve that problem by devising means to preclude force reactions from the cylinder to be imposed or concentrated upon the middle portion of the shaft member by distributing or spreading the transverse reaction force or load along the length of the shaft member or to transmit it to points as close as possible to the journal-supported end portions of the shaft member. In some respects this problem and its solution is illustrated in my Patent No. 2,453,975, filed August 3, 1946, from which this patent has been divided.

Although this invention is herein shown to be embodied in the tilting mechanism of a dump truck, that embodiment is not to be considered as limiting with respect to other fields of application. For example, the improved construction may serve in swingably raising and lowering the boom of a vehicular crane.

According to this invention, I provide at each side of the cylinder a stiffener or rib-like load-transmitting or -bracing member. Each bracing member is thus disposed substantially in a plane with the axes of the cylinder and of the shaft member representing a three-cornered structure, the two base corner portions of which are fastened to respective points of the adjacent portion of the cross shaft member, while the third corner portion is fastened to the free or forward end portion of the cylinder. Adjustable means are provided for individually fitting or tensioning each bracing member when the same is being mounted in place.

According to one feature, the three-cornered bracing member is in the nature of a box structure or rectangular triangle. According to another feature, the adjustable means comprise an eccentric device. According to still another feature, the base edge portion of the triangular box structure or bracing member is shaped to hug the adjacent circumferential portion of the shaft member, whereby it aligns itself with the shaft member. Suitable clamping or anchoring means surround the shaft member in connecting the box structure thereto.

The swingable cylinder together with the cross-shaft member represents a T-shaped structure in which the cross-shaft member is the head and the cylinder is the stem of the T. The head is supported at each end for absorbing a load acting transversely upon the head when a compressive load is imposed upon the stem of the T. This invention provides an attachment comprising a pair of box-shaped bracing members in the form of right-angled triangles symmetrically disposed with respect to the stem and with their planes extending in the plane of the T so that the right angled corner portions of the members lodge in respective right angles formed by the junction of the head with the stem, with inner fastening means attaching these portions to the head. One pair of acute-angle portions of the triangles are pointing in opposite directions, each being disposed adjacent to a respective supported end of the head, with outer fastening means attaching each such portion to the head. The other pair of acute-angle portions of the triangles are co-directed and disposed adjacent to the stem each being rigidly attached to the stem by means of an eccentric-containing device. The eccentric in each such device is operable or adjustable to effect pretensioning of the stem along with pre-compression of the bracing members for thereby diverting the compressive load from the stem to the supported ends of the head.

The best embodiment of the invention now known to me has been chosen for illustration purposes, but it should in no sense be taken as limiting because obviously the invention is capable of other embodiments with changes both in detail and construction, so long as they do not depart from the ambit of the appended claim.

In the drawings:

Fig. 4 is a perspective detail view of one of the load-transmitting bracing members;

Fig. 5 is a cross-section on line 5—5 of Fig. 4; and

Fig. 6 is an enlarged sectional view of the adjustable mounting means for the load-transmitting bracing member.

Figure 1:
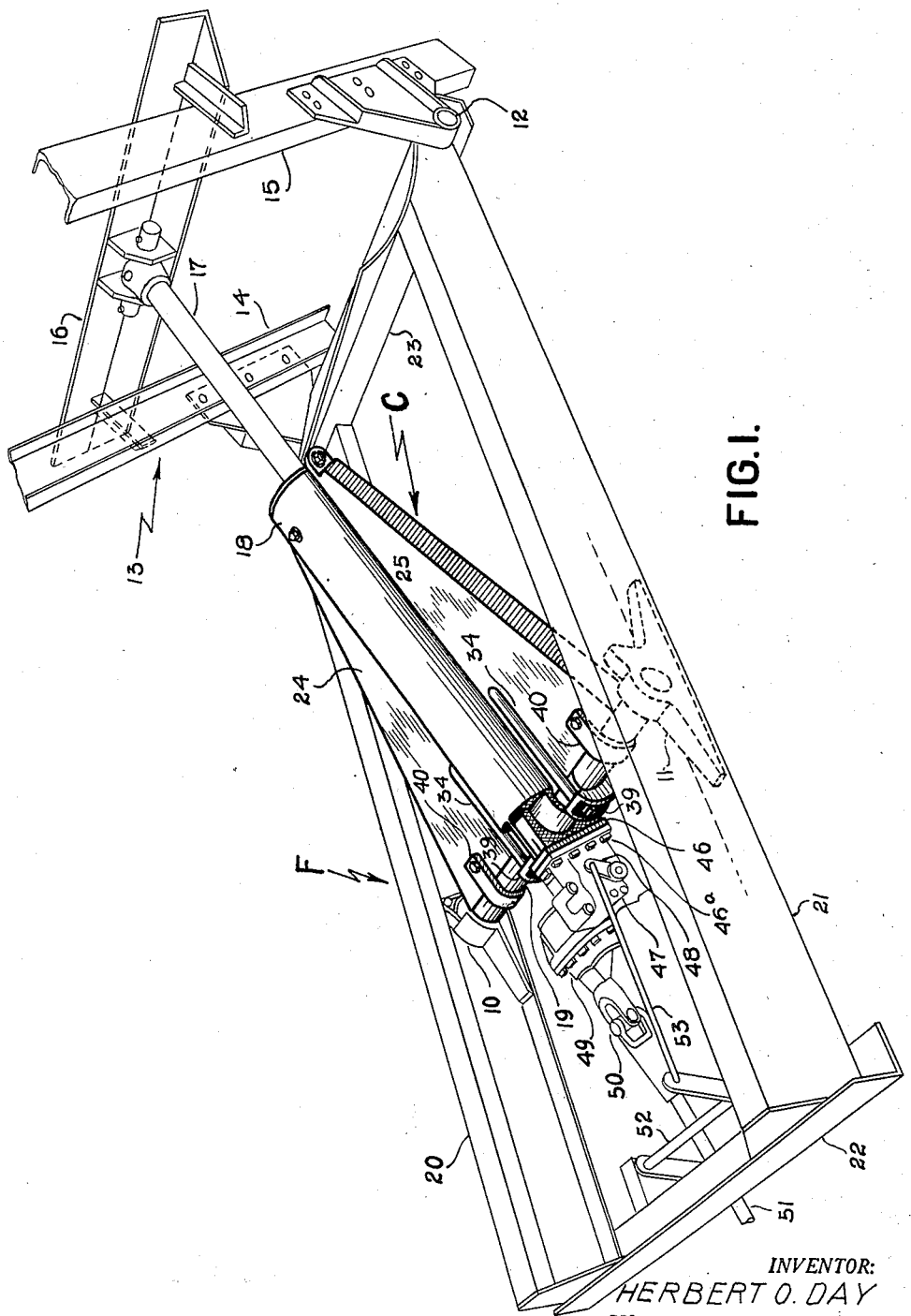
Figure 1 is a perspective view of the power cylinder mounted upon the chassis of a dump truck.

Environmentally, the swingable cylinder unit C is shown in Fig. 1 to be mounted by means of journals 10 and 11, upon the chassis frame F of a dump truck, to serve in tilting the body thereof when dumping a load therefrom. The rear end of the chassis frame F has swingably mounted thereon as at 12, a tiltable body 13 fractionally indicated by longitudinal members 14 and 15 and a cross member 16 to which attaches the piston rod 17, which is extendable from, and retractable into, the cylinder 18 proper of the cylinder unit C.

Through a bore 18ª (see Figs. 2 and 3) in the rear end 18ᵇ of the cylinder 18, extends a cross shaft member 19, the ends of which are rotatable in the journals 10 and 11 mounted upon the inside of longitudinal members 20 and 21 of the frame F rigidly interconnected as by cross members 22 and 23.

Figure 2:
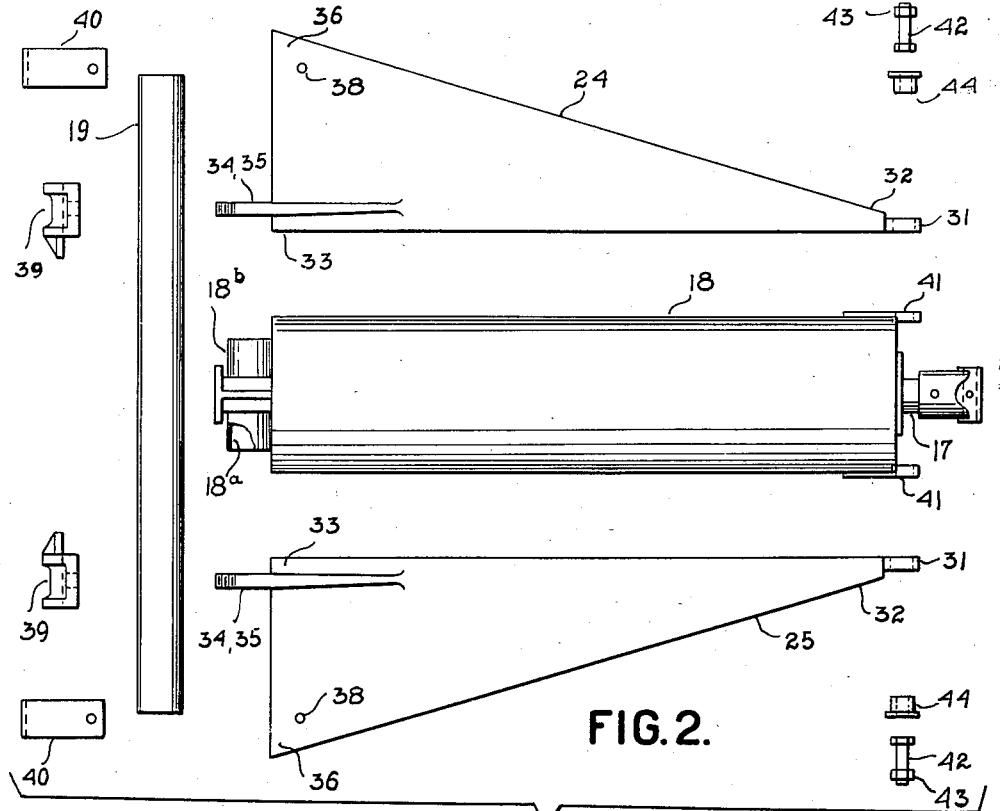
Fig. 2 is an exploded plan view of the cylinder unit.
Figure 3:
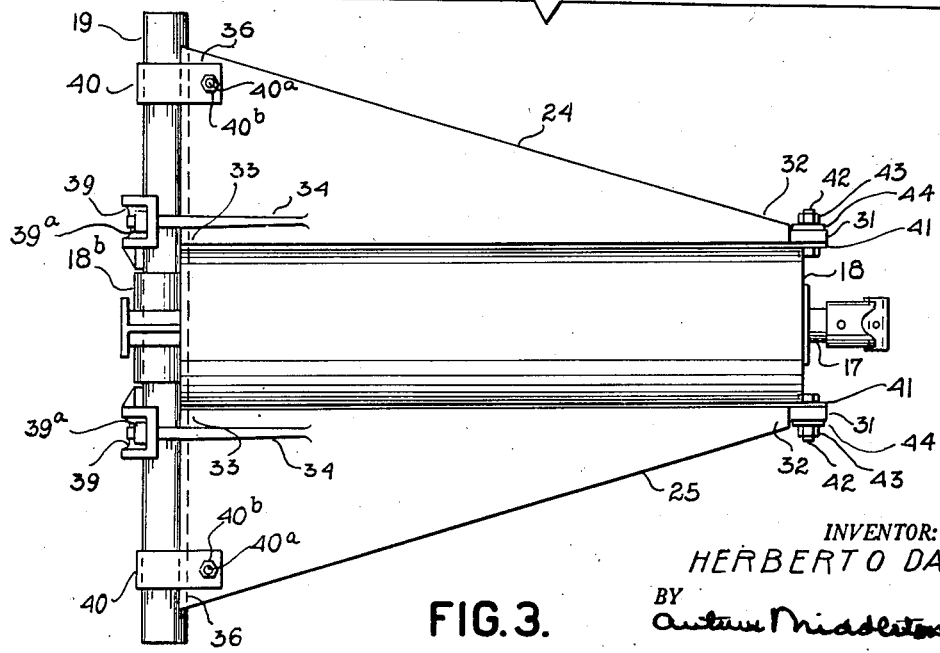
Fig. 3 is a plan view of the cylinder unit.

As shown in Figures 1, 2 and 3, the cylinder unit C comprises a pair of force-transmitting bracing members 24 and 25 of triangular shape although of box-like construction, more clearly shown in the enlarged part-sectional detail perspective of Fig. 4. The box structure is welded and comprises a top plate 26 and an identical bottom plate 27 in the shape of a rectangular triangle, a pair of converging side walls 28 and 29, and an intermediate wall or rib 30 converging with the side walls. The side wall 28 and the intermediate rib 30 together terminate in a tab or eye portion 31 to serve in anchoring the first or pointed or forward end or corner portion 32 of the bracing member to the front end portion of the cylinder 18.

At or near the second or right-angle corner 33 of the box shape there is provided a pair of bolts 34 and 35 welded respectively to the top plate 26 and the bottom plate 27. At the third or outer corner portion 36 of the box shape there is provided a half-shell bearing or rest portion 37 welded to and extending between the diverging ends of the side wall 29 and the intermediate wall or rib 30, and incidentally also welded to the top and bottom plates 26 and 27. The outer corner portions of the triangular top and bottom plates are also provided with registering bolt holes 38.

The wide rear end portion of each of the triangular box-like bracing members is fastened to the cross shaft member 19 by a half-shell clamping member 39 slipped over the bolts 34 and 35 and held tight by a pair of nuts 39ª. The outer corner portion of each bracing member is held in place relative to the cross shaft member 19 by means of a U-shaped steel band 40, having a fastening bolt 40ª extending through the bolt holes 38 and a nut 40ᵇ.

The pointed or forward corner portion 32 of each bracing member is fastened to a corresponding forward end portion of the cylinder 18, namely, to an eye portion 41 welded to the cylinder and associated with the eye portion 31 of the bracing member. Referring more specifically to the detail in Fig. 6, the means for this fastening comprise a through-bolt 42 with nut 43, which bolt extends through an eccentric bushing 44 which is rotatably fitted into the eye portion 31 of the bracing member.

In assembling the component parts which constitute the cylinder unit C, the cross-shaft member 19 is first inserted into, and positioned in, the transverse bore 18ª of the cylinder proper. The bracing members 24 and 25 are then added by first positioning and fastening the wide or rear-end portion thereof upon the corresponding portions of the cross shaft member 19, and then fastening the pointed or forward-corner portion 32 to the front-end portion of the cylinder. A tight fitting and unitary rigid connection or junction of the bracing members with the cylinder and with the cross shaft member can then be effected by turning the eccentric bushing 44 until tight, and then tightening the nut 43 upon the bolt 42. In this manner a solid and exceedingly strong unitary structure is created from the component parts comprising the cylinder 18, the cross shaft member 19, and the bracing members 24 and 25, through which unfavorable stresses upon the cross shaft member are effectively absorbed and transmitted to the journals 10 and 11.

The rear end of the cylinder 18 has a rectangular flange portion 46 to which is bolted as at 46ª a hydraulic control or master valve unit 47 having a central lever 48 to operate the power cylinder 18. A pump 49 to furnish the hydraulic pressure fluid is shown to be unitary with the control valve 47, being driven through a universal joint 50 by a shaft 51 from the truck engine (not shown). Suitable ports and flow passages connect the valve unit 47 with the power cylinder and with a reservoir, but are not specifically shown. The valve control lever 48 may be actuated from the driver's seat as through crank shaft 52 being linked to the control lever 48 by a rod 53.

When adjusting the eccentric bushing, it may be turned in one direction whereby the cylinder is placed under compression stress and the bracing member under tension stress; or the bushing may be turned in the opposite direction whereby the stress relationship is reversed, placing the cylinder under tension stress and the bracing member under compression stress. By adjusting in the last-mentioned manner, the force reaction from the power cylinder and from the piston rod is more assuredly transmitted through the bracing members to the respective end portions of the cross shaft member.

It will be noted in the perspective view of Fig. 1 that the parts pertaining more directly to the invention have been accentuated by heavier lines and shading, while the more environmental parts have been toned down by lighter lines or by omitting the shading.

I claim:

An attachment in combination with a T-shaped structure having its head supported at each end for absorbing a load acting transversely upon the head when a compressive load is imposed upon the stem of the T, said attachment comprising a pair of box-shaped bracing members in the form of right-angled triangles symmetrically disposed with respect to the stem and with their planes extending in the plane of the T so that the right-angled corner portions of the members lodge in respective right angles formed by the junction of the head with the stem, with each of one pair of acute-angle portions of the triangles disposed adjacent to a respective supported end and the other pair of acute-angle portions of the triangles being co-directed with each of them disposed adjacent to the stem, inner fastening means attaching the right-angled portion of each bracing member to the head, outer fastening means for attaching each of said one pair of acute-angle portions to the head, an eccentric-containing device rigidly attaching each of said other pair of acute-angle portions to the stem, the eccentric in each said device being operable to effect the pre-tensioning of the stem along with pre-compression of the bracing members for thereby diverting the compressive load from the stem to the supported ends of the head.

HERBERT O. DAY.

REFERENCES CITED

The following references are of record in the file of this patent:

UNITED STATES PATENTS

| Number | Name | Date |
|---|---|---|
| 2,090,826 | Austin | Aug. 24, 1937 |
| 2,210,143 | Day | Aug. 6, 1940 |
| 2,226,213 | Wood | Dec. 24, 1940 |
| 2,234,134 | Barrett | Mar. 4, 1941 |
| 2,453,975 | Day | Nov. 16, 1948 |